(12) United States Patent
Matsubara et al.

(10) Patent No.: US 9,841,751 B2
(45) Date of Patent: Dec. 12, 2017

(54) NUMERICAL-CONTROL MACHINING-PROGRAM CREATION DEVICE

(71) Applicant: Mitsubishi Electric Corporation, Tokyo (JP)

(72) Inventors: Susumu Matsubara, Tokyo (JP); Kenji Iriguchi, Tokyo (JP); Nobuyuki Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 127 days.

(21) Appl. No.: 14/888,742

(22) PCT Filed: May 15, 2013

(86) PCT No.: PCT/JP2013/063592
§ 371 (c)(1),
(2) Date: Nov. 3, 2015

(87) PCT Pub. No.: WO2014/184908
PCT Pub. Date: Nov. 20, 2014

(65) Prior Publication Data
US 2016/0077518 A1    Mar. 17, 2016

(51) Int. Cl.
*G05B 19/4099*    (2006.01)
*G05B 19/4097*    (2006.01)

(52) U.S. Cl.
CPC ..... *G05B 19/4099* (2013.01); *G05B 19/4097* (2013.01); *G05B 2219/35134* (2013.01); *G05B 2219/37441* (2013.01); *Y02P 90/265* (2015.11)

(58) Field of Classification Search
CPC ............ G05B 19/4097; G05B 19/4099; G05B 2219/35314; G05B 2219/37441
See application file for complete search history.

(56) References Cited

U.S. PATENT DOCUMENTS

| 5,293,321 A | 3/1994 | Fujita et al. |
| 6,675,060 B1 | 1/2004 | Matsubara et al. |

(Continued)

FOREIGN PATENT DOCUMENTS

| CN | 101334657 A | 12/2008 |
| CN | 102473007 A | 5/2012 |

(Continued)

OTHER PUBLICATIONS

Tawainese Office Action issued in TW 102143194 dated Feb. 9, 2015.

(Continued)

*Primary Examiner* — Chun Cao
(74) *Attorney, Agent, or Firm* — Sughrue Mion, PLLC; Richard C. Turner

(57) ABSTRACT

To provide a numerical-control machining-program creation device that creates a numerical-control machining program including turning machining based on shape data of a workpiece. The numerical-control machining-program creation device generates a turning-machining removal shape indicating a shape to be removed by turning machining based on a turning sectional shape, extracts a turning groove shape from the turning-machining removal shape, and creates the numerical-control machining program for turning machining based on a shape obtained by separating the turning groove shape from the turning-machining removal shape.

7 Claims, 15 Drawing Sheets

(56) References Cited

U.S. PATENT DOCUMENTS

| | | | |
|---|---|---|---|
| 7,487,006 B2 * | 2/2009 | Kamiya | G05B 19/4093 700/160 |
| 8,615,317 B2 * | 12/2013 | Neumaier | G05B 19/40937 451/11 |
| 8,805,562 B2 | 8/2014 | Matsubara et al. | |
| 2012/0029675 A1 | 2/2012 | Matsubara et al. | |

FOREIGN PATENT DOCUMENTS

| | | |
|---|---|---|
| JP | 4-76606 A | 3/1992 |
| JP | 05-277891 A | 10/1993 |
| JP | 05-289736 A | 11/1993 |
| JP | 05-290130 A | 11/1993 |
| JP | 05-324040 A | 12/1993 |
| JP | 10-105221 A | 4/1998 |
| JP | 2001-121383 A | 5/2001 |
| JP | 2003-280711 A | 10/2003 |
| JP | 2004-301668 A | 10/2004 |
| JP | 2006-53945 A | 2/2006 |
| JP | 2007-058531 A | 3/2007 |
| JP | 4276656 B2 | 6/2009 |
| WO | 2004/038522 A1 | 5/2004 |
| WO | 2011/004420 A1 | 1/2011 |

OTHER PUBLICATIONS

International Search Report of PCT/JP2013/063592 dated Jul. 9, 2013.

Communication dated Jan. 23, 2017 from the State Intellectual Property Office of the P.R.C., in counterpart Chinese application No. 201380076299.2.

Communication dated Sep. 12, 2017 from the State Intellectual Property Office of the P.R.C. in counterpart Application No. 201380076299.2.

* cited by examiner

✱ :SHAPE CHARACTERISTIC POINT

FIG.16
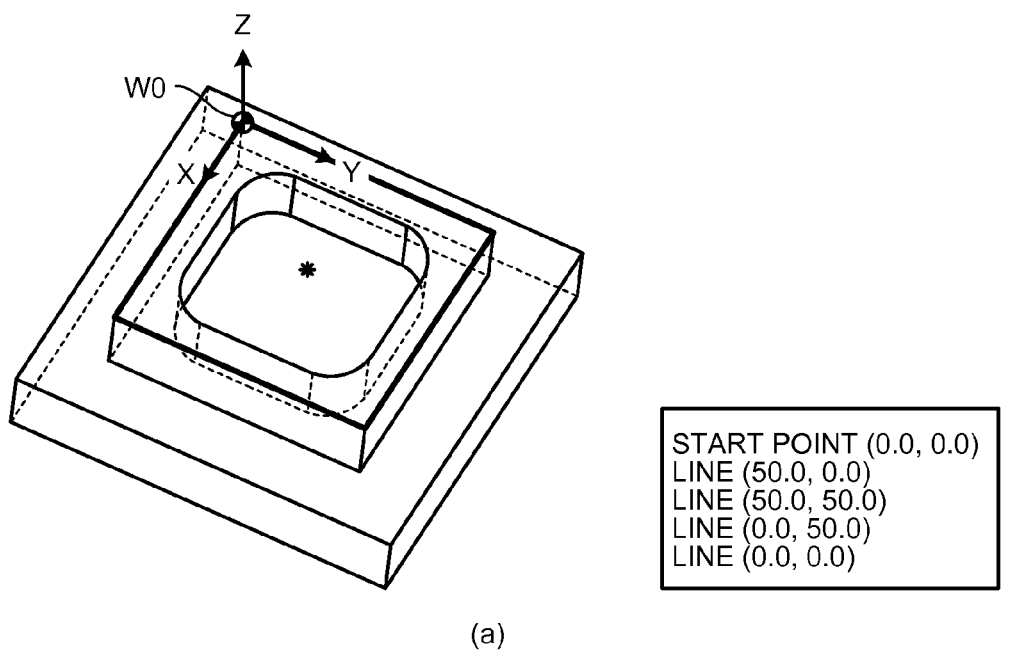
START POINT (0.0, 0.0)
LINE (50.0, 0.0)
LINE (50.0, 50.0)
LINE (0.0, 50.0)
LINE (0.0, 0.0)
(a)
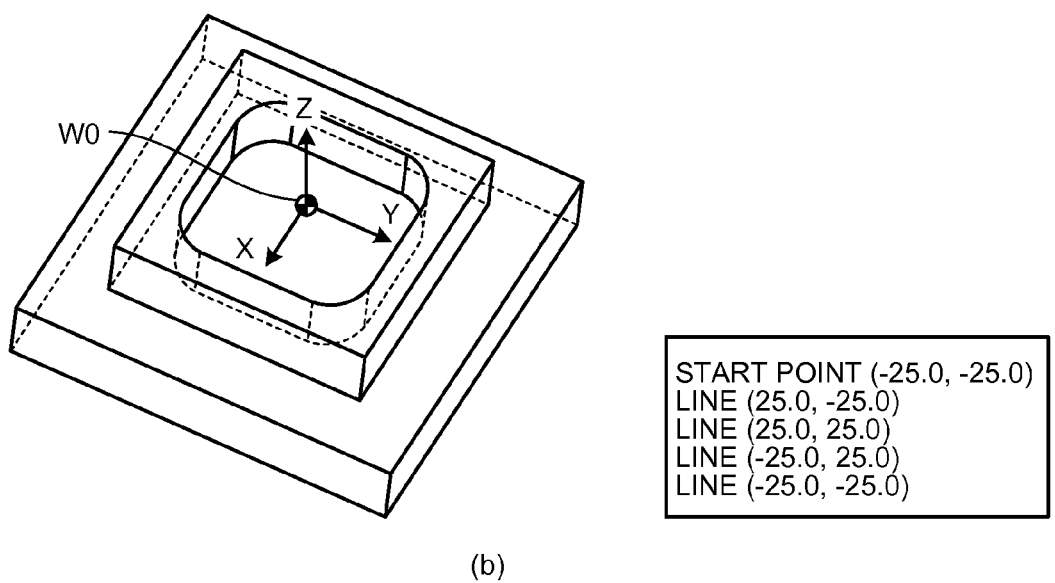
START POINT (-25.0, -25.0)
LINE (25.0, -25.0)
LINE (25.0, 25.0)
LINE (-25.0, 25.0)
LINE (-25.0, -25.0)
(b)

FIG.18
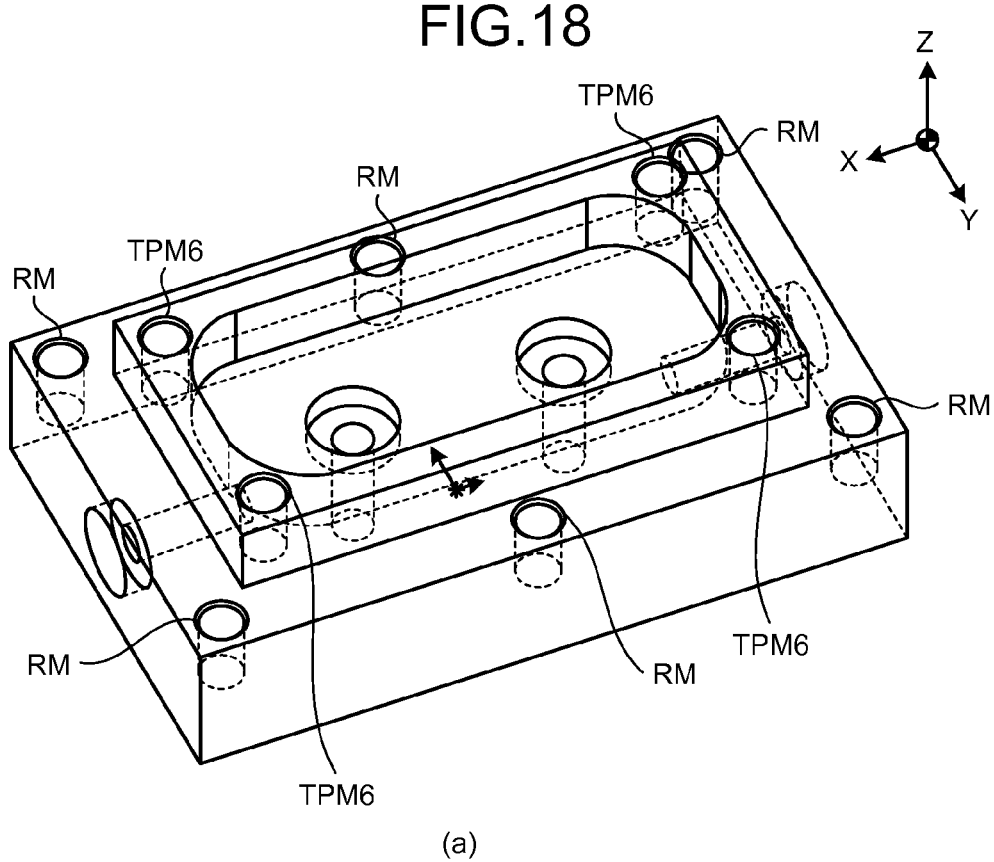
(a)
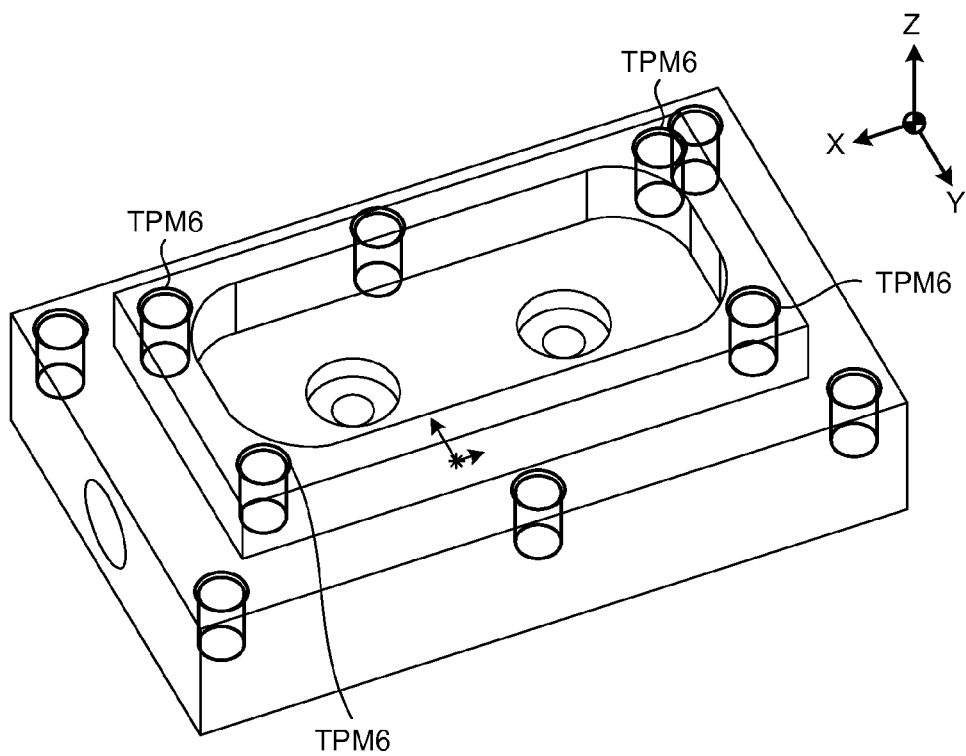
(b)

NUMERICAL-CONTROL MACHINING-PROGRAM CREATION DEVICE

CROSS REFERENCE TO RELATED APPLICATIONS

This is a National Stage of International Application No. PCT/JP2013/063592 filed May 15, 2013, the contents of which are incorporated herein by reference in its entirety.

FIELD

The present invention relates to a numerical-control machining-program creation device that creates a numerical-control machining program for executing numerical control of a machine tool.

BACKGROUND

In recent years, enhancement of an NC-program creation support function of a program creation device has been promoted, such that an operator can easily create an NC machining program by setting a coordinate value of a workpiece in a program creation device, while looking at a production drawing. Further, a program creation device that directly reads CAD data modeled by a designer by using a CAD system into the program creation device to create an NC machining program has been proposed.

When CAD data including only product shapes is handled, machining instructions and dimension display data described in the production drawing may not be reflected in the CAD data, and thus the machining instructions and dimension display data described in the production drawing need to be reflected in the NC machining program so as not to cause a machining defect.

In Patent Literature 1, an extension line extending from both ends of a profile line is displayed on a display screen, in addition to the profile line connecting from a machining change point to a machining change point of a machining pattern of an object to be machined acquired by an input unit or from a memory. The extension line on a machining start side of the profile line to be selected is selected on the screen according to a machining procedure, and then the extension line on the machining start side of the profile line to be selected next is selected on the screen. This process is repeated to set the machining procedure of the object to be machined.

CITATION LIST

Patent Literature

Patent Literature 1: Japanese Patent Application Laid-open No. H10-105221

SUMMARY

Technical Problem

According to the technique described in Patent Literature 1, a machining engineer himself or herself needs to set the machining procedure, and has to divide a cutting remainder portion due to a tool shape and a groove shape in a turning machining shape, thereby causing a problem of leaving an unset and undivided portion of the groove shape.

The present invention has been achieved in view of the above problems, and an object of the present invention is to provide a numerical-control machining-program creation device that can create an NC machining program including turning machining easily and efficiently, with less time and labor.

Solution to Problem

To achieve the above described object, a numerical-control machining-program creation device according to the present invention creates a numerical-control machining program including turning machining based on shape data of a workpiece. The numerical-control machining-program creation device includes: a turning sectional-shape generation unit that generates a three-dimensional turning shape designating a turning shaft as a rotation central axis from shape data of a workpiece, and generates a two-dimensional turning sectional shape based on the generated turning shape; a turning-machining removal-shape generation unit that generates a first turning-machining removal shape indicating a shape to be removed by turning machining based on the turning sectional shape; a turning-groove-shape extraction unit that extracts a turning groove shape from the first turning-machining removal shape; and a numerical-control machining-program creation unit that creates a numerical-control machining program for turning machining based on a second turning-machining removal shape obtained by separating the turning groove shape from the first turning-machining removal shape.

Advantageous Effects of Invention

According to the present invention, cutting remainder shape portions due to a turning tool to be used and machining shape portions of turned grooves are automatically extracted and separated. Therefore, the NC machining program including turning machining can be created easily and efficiently, with less time and labor.

BRIEF DESCRIPTION OF DRAWINGS

FIG. 16 are diagrams for supplementarily explaining the operation according to FIG. 12.

FIG. 18 are diagrams for supplementarily explaining the operation according to FIG. 17.

DESCRIPTION OF EMBODIMENTS

Exemplary embodiments of a numerical-control machining-program creation device according to the present invention will be explained below in detail with reference to the accompanying drawings. The present invention is not limited to the embodiments.

First Embodiment

Figure 1:
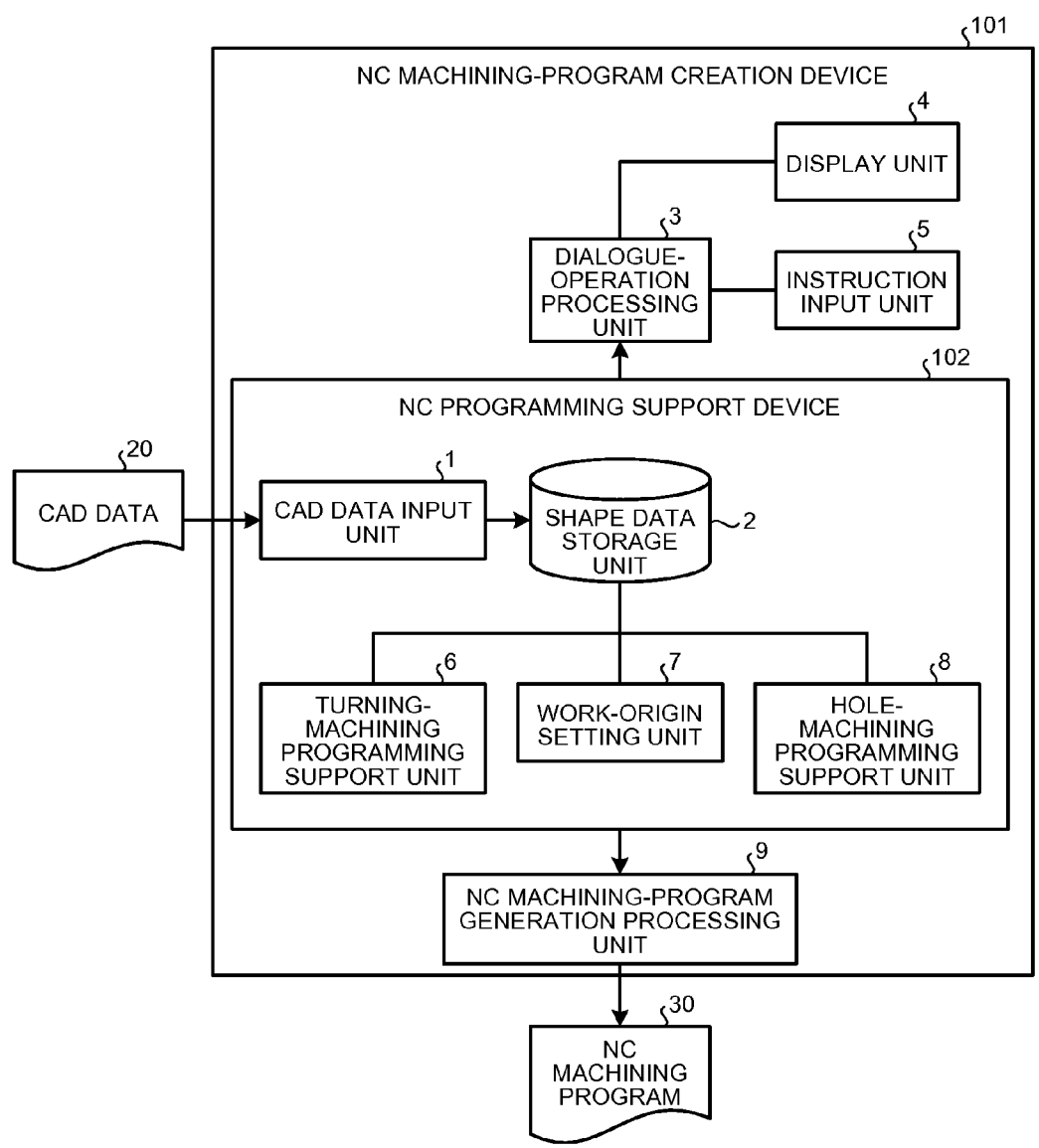
FIG. 1 is a block diagram illustrating an NC machining-program creation device according to a first embodiment of the present invention.

FIG. 1 is a block diagram illustrating a configuration of a numerical-control machining-program creation device (NC machining programming device) according to a first embodiment of the present invention. An NC machining programming device 101 includes a dialogue-operation processing unit 3, a display unit 4, an instruction input unit 5, an NC programming support device 102, and an NC machining-program generation processing unit 9. The NC programming support device 102 includes a CAD data input unit 1, a shape-data storage unit 2, a turning-machining programming support unit 6, a work-origin setting unit 7, and a hole-machining programming support unit 8.

The NC machining programming device 101 may be constructed as a device dedicated to create an NC machining program, or may be constructed in a personal computer or an NC device. A hardware configuration of the NC machining programming device 101 is substantially the same as a general personal computer having a CPU, a memory, and the like, and the dialogue-operation processing unit 3, the turning-machining programming support unit 6, the work-origin setting unit 7, the hole-machining programming support unit 8, and the like are configured by software.

The CAD data input unit 1 inputs CAD data 20 from an external device such as a CAD system or a CAD data memory, and transmits the CAD data 20 to the shape-data storage unit 2. The CAD data 20 is configured to include shape data of a workpiece (an object to be machined) created by using the CAD system or the like (basic dimension of the workpiece), data relating to dimension tolerance (or a tolerance class) being surface roughness information set on the CAD system, or data relating to machining instructions such as screwing and fitting. The shape-data storage unit 2 stores therein the CAD data 20 transmitted from the CAD data input unit 1.

The display unit 4 is a display terminal such as a liquid crystal monitor, and displays the CAD data 20, graphic elements of the shape data specified by a worker, data relating to machining, and the like. The instruction input unit 5 is configured to include a mouse and a keyboard, and inputs instruction information from the worker (graphic elements and data relating to machining described later). The input instruction information is transmitted to the dialogue-operation processing unit 3.

The turning-machining programming support unit 6 supports machining program creation relating to turning machining in which a workpiece is rotated and rounded. The turning-machining programming support unit 6 generates a turning shape being a three-dimensional shape to be finished by the turning machining and a turning half sectional shape acquired by projecting the turning shape on a +XZ plane, in which an XZ plane is limited to a +X direction, from the CAD data 20 stored in the shape-data storage unit 2, and displays the generated turning shape, the turning half sectional shape, and an input column of the turning machining data on the display unit 4. At the time of display, the worker inputs instruction information from the instruction input unit 5. The input instruction information is transmitted to the dialogue-operation processing unit 3, and then input to the turning-machining programming support unit 6. The turning-machining programming support unit 6 generates a turning machining shape to be removed by the turning machining, from which a cutting remainder portion generated due to a tool shape and a groove-shaped portion are removed, based on the turning machining shape instructed by the worker, the turning half sectional shape, and the turning machining data, and transmits the generated turning machining shape and the turning machining data as a turning machining program to the shape-data storage unit 2.

The work-origin setting unit 7 displays a plurality of shape elements, which become candidates of a work origin being a provisional reference point in the machine coordinate system, on the display unit 4 as shape characteristic points from the CAD data 20 stored in the shape-data storage unit 2. At the time of display, the worker inputs the instruction information from the instruction input unit 5. The input instruction information is transmitted to the dialogue-operation processing unit 3, and is input to the work-origin setting unit 7. The work-origin setting unit 7 sets the shape element indicating the work origin and the work coordinate system being a coordinate system based on the work origin, based on the instructed information. The set shape element indicating the work origin and the work coordinate system are stored in the shape-data storage unit 2.

The hole-machining programming support unit 8 supports machining program creation relating to milling in which the workpiece is fixed and cut by rotating a blade. The hole-machining programming support unit 8 displays the CAD data 20 stored in the shape-data storage unit 2, the work origin, and the coordinate system on the display unit 4, and also displays the input column of the hole machining data or the like on the display unit 4. At the time of display, the worker inputs the instruction information from the instruction input unit 5. The input instruction information is transmitted to the dialogue-operation processing unit 3, and then input to the hole-machining programming support unit 8. The hole-machining programming support unit 8 transmits a hole machining shape being a shape to be removed by hole machining and hole machining data to the shape-data storage unit 2, based on a hole shape to be subjected to hole machining instructed by the worker. The hole-machining programming support unit 8 extracts the hole shape identical to the hole shape transmitted to the shape-data storage unit 2 from the CAD data 20 stored in the shape-data storage unit 2, and displays the hole shape on the display unit 4. At the time of display, the worker inputs the instruction information from the instruction input unit 5. The input instruction information is transmitted to the dialogue-operation processing unit 3, and then input to the hole-machining programming support unit 8. The hole-machining programming support unit 8 groups the hole shape instructed by the worker, of the hole shapes identical to the hole shape transmitted to the shape-data storage unit 2, as the hole shape to be subjected to hole machining, and transmits the grouped hole shapes (milling shapes) and the hole machining data (milling data) to the shape-data storage unit 2 as a hole machining program.

The NC machining-program generation processing unit 9 generates an NC machining program 30 including the turning machining program and the milling program based on: the turning machining program including the turning machining shape stored in the shape-data storage unit 2 and data relating to the turning machining; the milling program including the milling shape and data relating to the milling; and the work origin, and the work coordinate system, and outputs the NC machining program 30 to outside.

Figure 2:
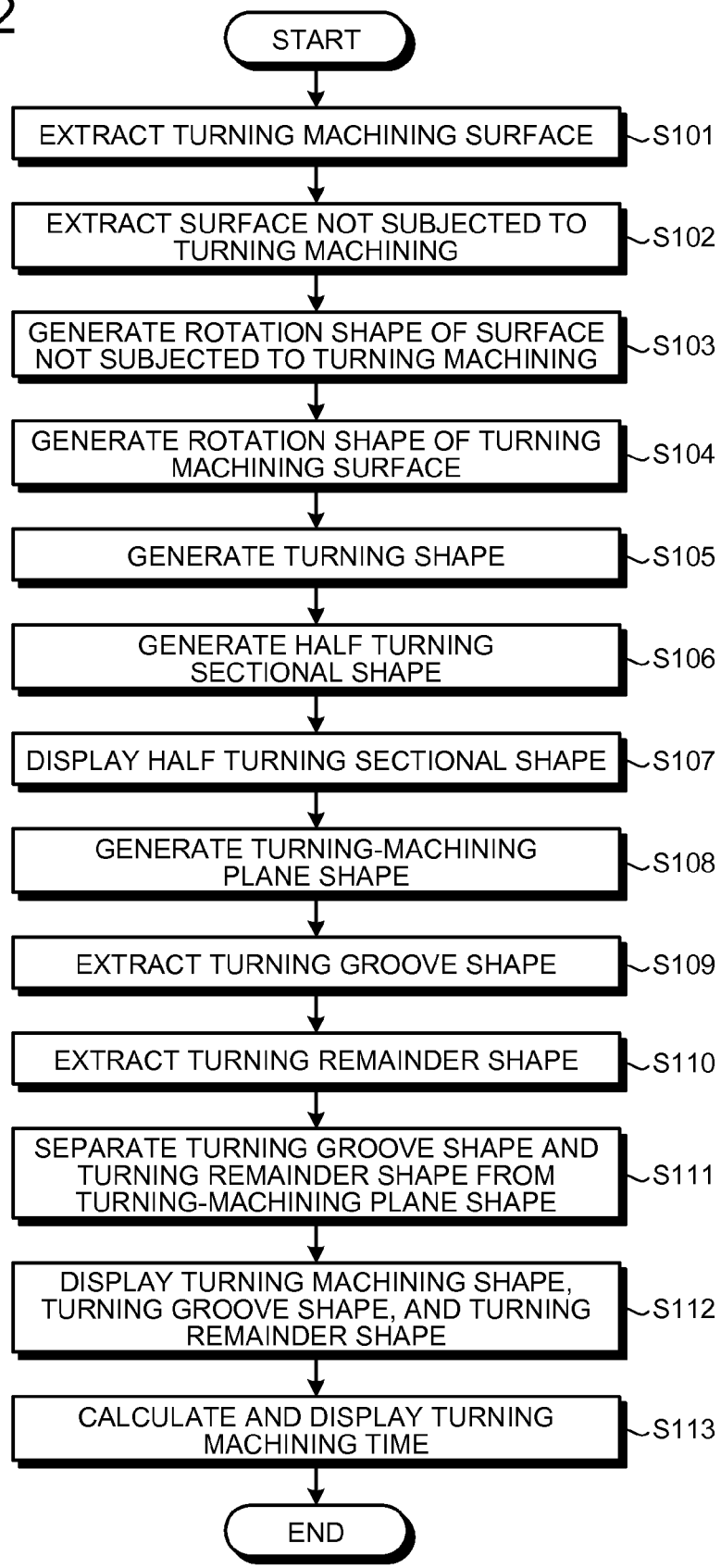
FIG. 2 is a flowchart illustrating an operation of a turning-machining programming support unit of the NC machining-program creation device according to the first embodiment of the present invention.
Figure 3:
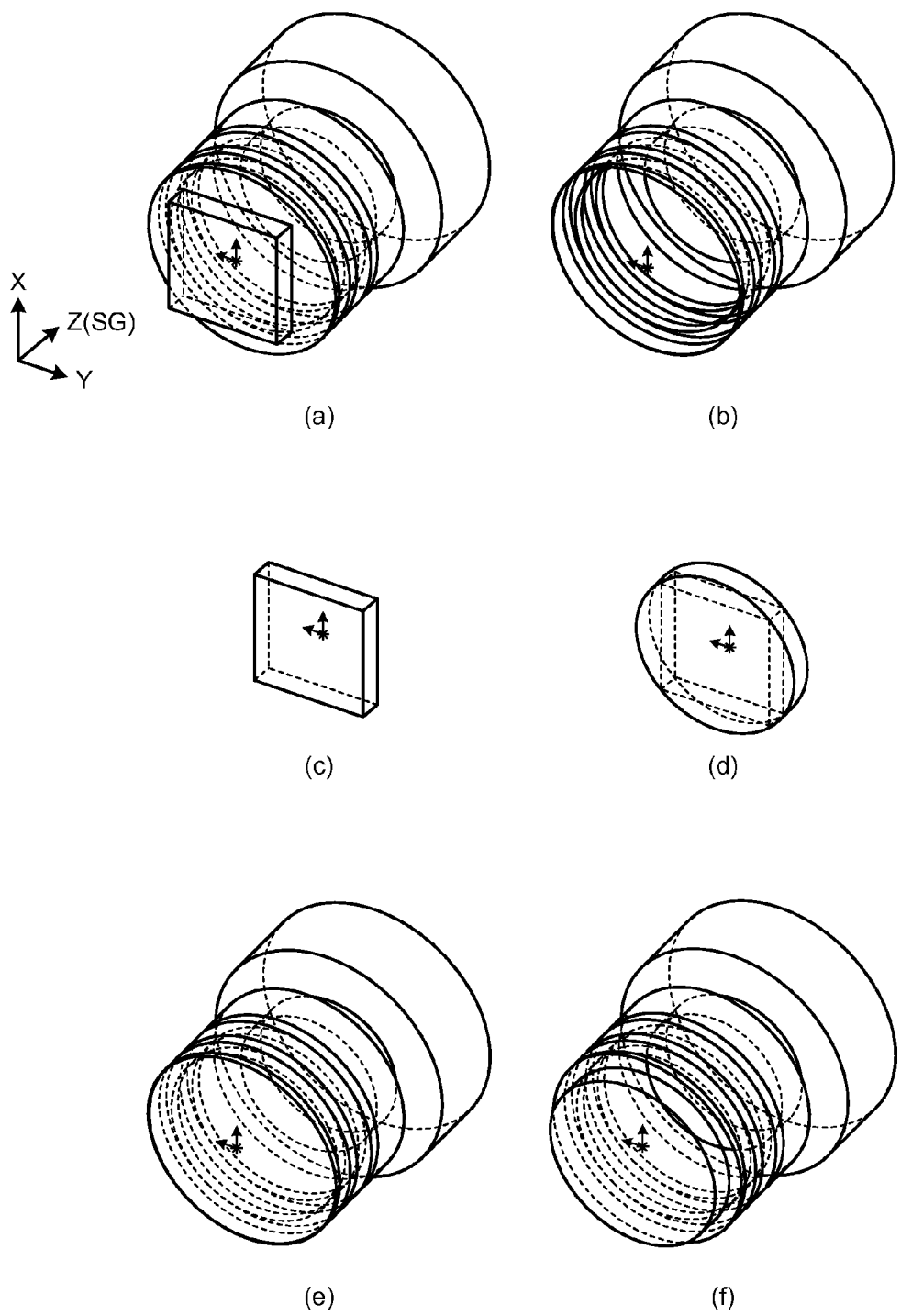
FIG. 3 are diagrams for supplementarily explaining the operation according to FIG. 2.

The turning-machining programming support unit 6 will be described below in more detail. FIG. 2 is a flowchart illustrating an operation example of the turning-machining programming support unit 6. In the turning-machining programming support unit 6, a Z axis of XYZ axes is designated as a turning axis SG, being a central axis at the time of performing the turning machining. The turning-machining programming support unit 6 extracts a cylindrical surface and a conical surface having the same rotation central axis as the turning axis SG as a turning machining surface from the CAD data 20 indicating a product shape (Step S101). When the CAD data 20 is defined in an expression of a boundary surface of a solid model, it can be analyzed whether it is the cylindrical surface or the conical surface by referring to geometric information of the respective boundary surfaces, and at the same time the rotation central axis of the cylindrical surface and the rotation central axis of the conical surface can be analyzed. FIG. 3(*a*) is an example illustrating the CAD data. FIG. 3(*b*) is an example illustrating the turning machining surface extracted from the CAD data.

The turning-machining programming support unit 6 then extracts a surface other than the surfaces extracted at Step S101 as a surface not subjected to turning machining from the CAD data 20 (Step S102). FIG. 3(*c*) is an example illustrating the surface not subjected to turning machining, extracted from the CAD data. The turning-machining programming support unit 6 rotates and projects the surface not subjected to turning machining about the turning axis SG to acquire a projection shape on the +XZ plane. The turning-machining programming support unit 6 also rotates a rectangular surface including the acquired projection shape about the turning axis by 360 degrees to generate a rotation shape of the surface not subjected to turning machining (Step S103). FIG. 3(*d*) is an example representing the rotation shape of the surface not subjected to turning machining. The turning-machining programming support unit 6 then interpolates an open surface of the turning machining surface (a surface orthogonal to a periphery) by the XY plane to generate the rotation shape of the turning machining surface (Step S104). FIG. 3(*e*) is an example representing the rotation shape of the turning machining surface. The turning-machining programming support unit 6 adds the rotation shape of the turning machining surface and the rotation shape of the surface not subjected to turning machining to generate a turning shape (Step S105). FIG. 3(*f*) is an example illustrating the turning shape.

Figure 4:
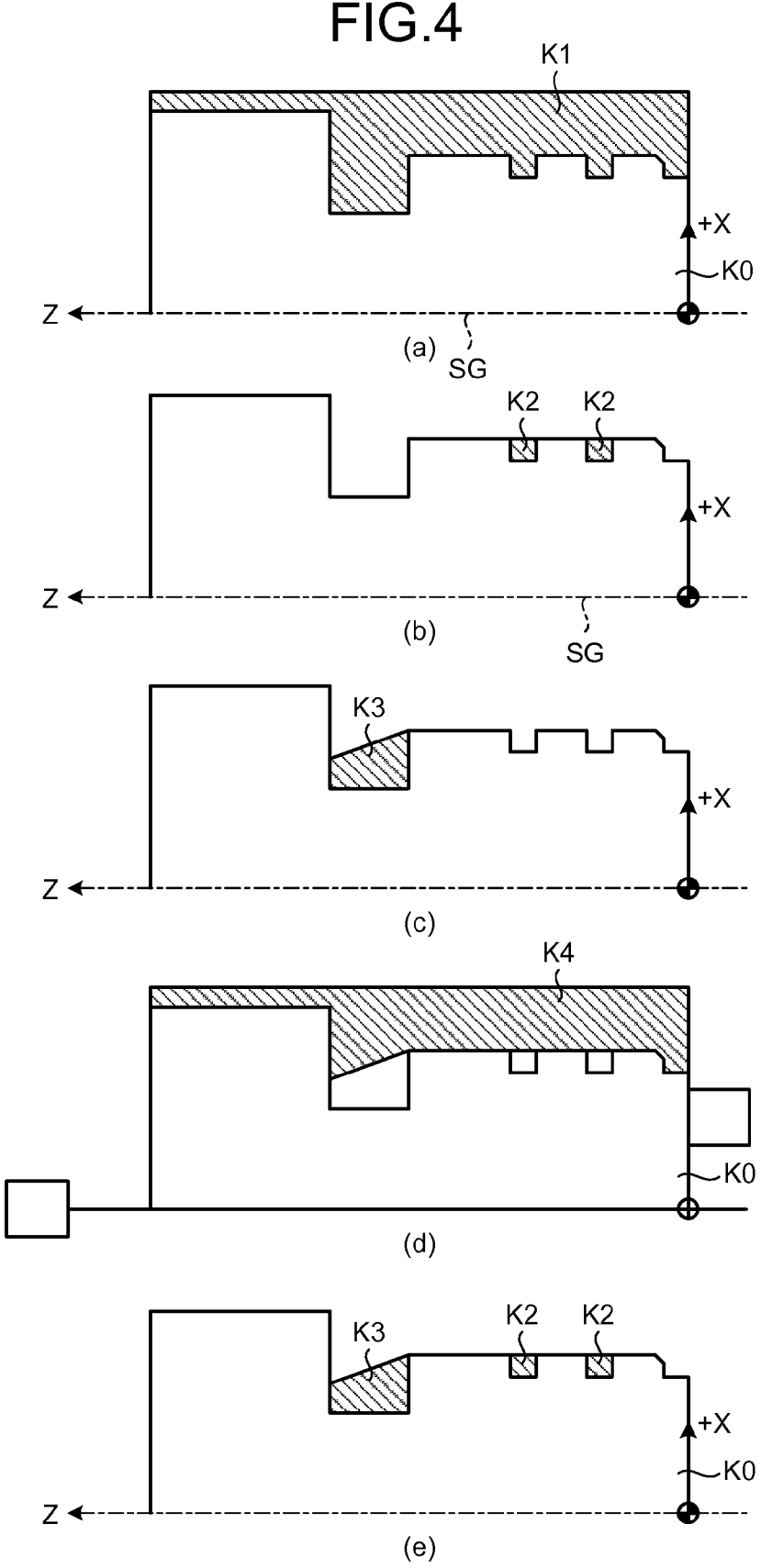
FIG. 4 are diagrams for supplementarily explaining the operation according to FIG. 2.

The turning-machining programming support unit 6 generates a half turning sectional shape K0 on the +XZ plane based on the generated three-dimensional turning shape (Step S106). When the turning shape is expressed in the boundary surface of the solid model, the half turning sectional shape can be generated by obtaining an intersection between the +XZ plane and the turning shape. The turning-machining programming support unit 6 displays the generated half turning sectional shape K0 on the display unit 4 (Step S107). FIG. 4(*a*) is an example illustrating the half turning sectional shape K0. The worker inputs the turning machining data including a turning tool to be used and a cutting condition, and a shape to be removed by the turning machining on the +XZ plane by the instruction input unit 5. A shape of a workpiece material may be input as the shape to be removed by the turning machining. The turning-machining programming support unit 6 generates a turning-machining plane shape (a shape to be removed by the turning machining) K1 indicating a portion to be removed by the turning machining on the +XZ plane, based on the shape input by the worker (Step S108). FIG. 4(*a*) illustrates an example of the turning-machining plane shape K1.

The turning-machining programming support unit 6 extracts a turning groove shape K2 to be machined by a groove turning tool from the turning-machining plane shape K1 based on the turning machining data input from the instruction input unit 5 (Step S109). FIG. 4(*b*) is an example representing the extracted turning groove shape K2. The turning-machining programming support unit 6 then extracts a turning remainder shape K3 by the turning tool to be used from the turning-machining plane shape K1 based on the turning machining data input from the instruction input unit 5 (Step S110). FIG. 4(*c*) is an example representing the turning remainder shape K3 by an auxiliary cutting edge angle. The turning-machining programming support unit 6 then separates the turning groove shape K2 and the turning remainder shape K3 from the turning-machining plane shape K1 (Step S111). FIG. 4(*d*) is an example representing a turning machining shape K4 after dividing the turning groove shape and the cutting remainder shape by the auxiliary turning edge angle. FIG. 4(*e*) is an example representing the turning groove shape K2 and the cutting remainder shape K3 by the auxiliary cutting edge angle.

The turning-machining programming support unit 6 displays the turning machining shape K4 obtained by separating the turning groove shape K2 and the turning remainder shape K3 from the turning-machining plane shape K1, the turning groove shape K2, and the turning remainder shape K3 on the display unit 4 (Step S112). The turning-machining programming support unit 6 calculates a turning machining time based on the turning machining data including the turning tool to be used and the cutting condition and the turning machining shape, and displays the turning machining time on the display unit 4 (Step S113).

Figure 5:
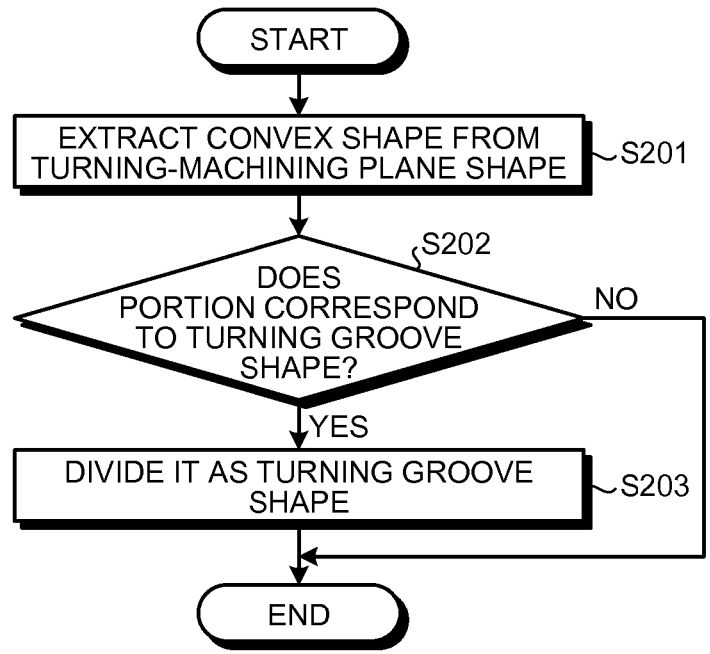
FIG. 5 is a flowchart illustrating an operation of the turning-machining programming support unit of the NC machining-program creation device according to the first embodiment of the present invention.

FIG. 5 is a flowchart illustrating details of an operation for extracting the turning groove shape K2 performed at Step S109 in FIG. 2. The turning-machining programming support unit 6 extracts a convex shape from the turning-machining plane shape K1 acquired at Step S108 (Step S201). Specifically, in the case of a turning external diameter shape as illustrated in FIG. 4, shape elements of a portion coming in contact with the half turning sectional shape K0 are followed sequentially for each edge, and a tangent vector of the edge is obtained for each apex being a contact point between the edges, to extract a portion where the value of the tangent vector in an X direction is negative. The turning-machining programming support unit 6 determines whether the extracted portion corresponds to the dimension of the turning groove shape K2 (Step S202). When an X-axis dimension and a Z-axis dimension of the extracted portion are equal to or less than a predetermined groove width and groove depth set by the worker, the turning-machining programming support unit 6 designates the extracted portion as the turning groove shape K2. The turning-machining programming support unit 6 divides the extracted convex shape to extract the turning groove shape K2 (Step S203).

Figure 6:
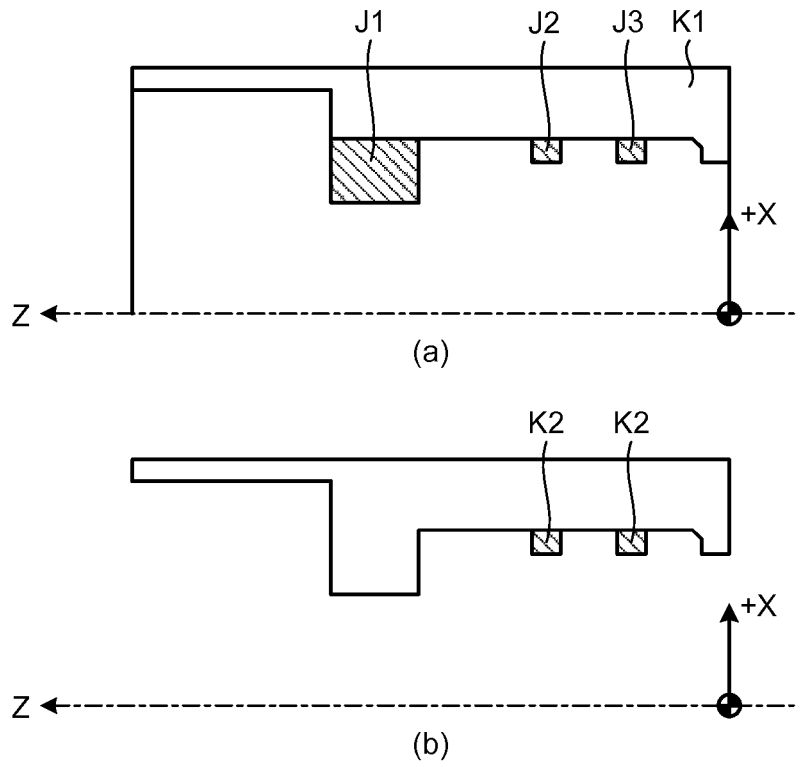
FIG. 6 are diagrams for supplementarily explaining the operation according to FIG. 5.

FIG. 6(a) is an example representing convex shape portions J1, J2, and J3 extracted at Step S201. FIG. 6(b) is an example representing the extracted turning groove shape K2. Because the X-axis dimension and the Z-axis dimension of the convex shape portion J1 are not equal to or less than the predetermined groove width and groove depth set by the worker, the convex shape portion J1 is excluded from the turning groove shape K2.

Figure 7:
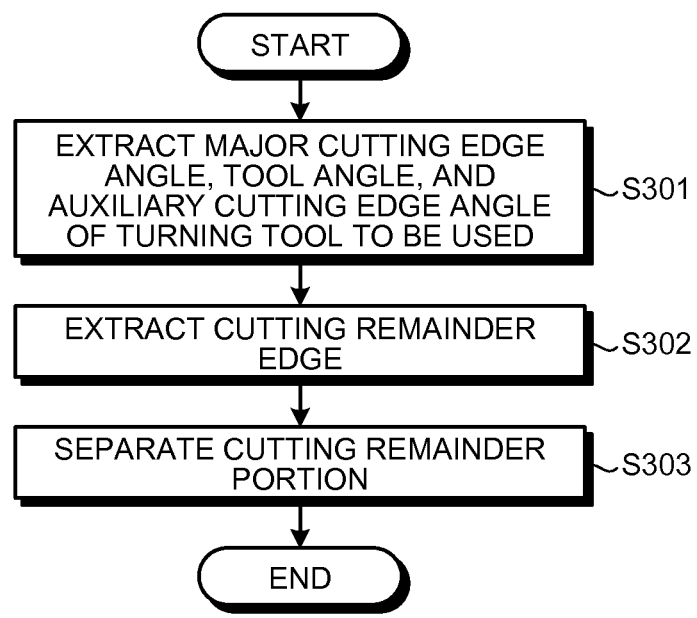
FIG. 7 is a flowchart illustrating an operation of the turning-machining programming support unit of the NC machining-program creation device according to the first embodiment of the present invention.
Figure 8:
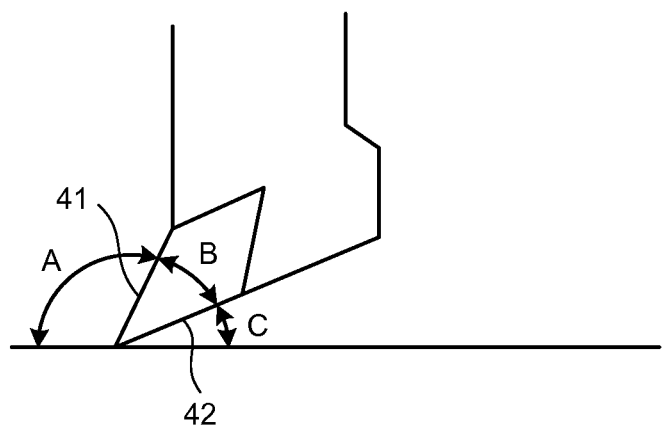
FIG. 8 is a diagram for supplementarily explaining a major cutting edge angle, a tool angle, and an auxiliary cutting edge angle of a turning tool.

FIG. 7 is a flowchart illustrating an operation for extracting the turning remainder shape K3 performed at Step S110 in FIG. 2. After extracting the turning groove shape K2 from the turning-machining plane shape K1 at Step S109 in FIG. 2, the turning-machining programming support unit 6 obtains a tool angle, a major cutting edge angle, and an auxiliary cutting edge angle of the turning tool to be used based on the turning machining data set by the worker (Step S301). The major cutting edge angle is a rake angle of the tool, and the auxiliary cutting edge angle is an angle obtained by subtracting the major cutting edge angle and the tool angle from 180 degrees. In FIG. 8, A indicates the major cutting edge angle, B indicates the tool angle, and C indicates the auxiliary cutting edge angle. In FIG. 8, 41 denotes the major cutting edge, and 42 denotes the auxiliary cutting edge. When turning machining is to be performed, because cutting at an angle equal to or larger than the auxiliary cutting edge angle C cannot be performed, a shape portion below (on the Z axis side of) the auxiliary cutting edge 42 cannot be machined by the turning tool, and is left uncut.

Figure 9:
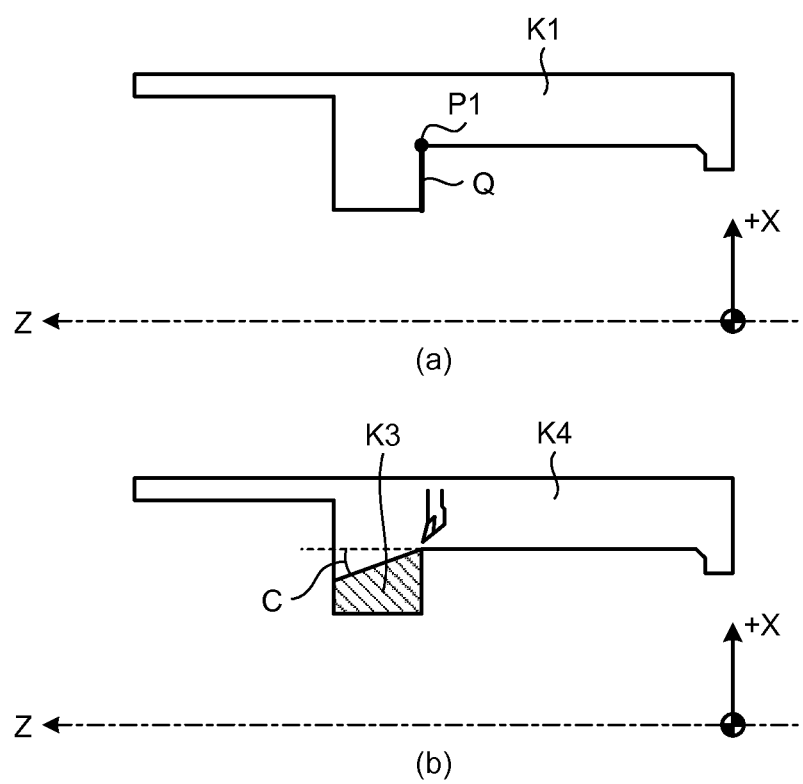
FIG. 9 are diagrams for supplementarily explaining the operation according to FIG. 7.

The turning-machining programming support unit 6 sequentially follows the shape elements of the portion coming in contact with the half turning sectional shape K0 of the turning-machining plane shape K1 for each edge, and the tangent vector of the edge is obtained for each apex being the contact point between the edges, to extract the portion where the value of the tangent vector in the X direction is negative (Step S302). The turning-machining programming support unit 6 then extracts the portion below (on the Z axis side of) the auxiliary cutting edge 42 from the turning machining shape K4. When an angle of the tangent vector of the next edge with respect to the Z axis direction is equal to or larger than the auxiliary cutting edge angle at an edge endpoint, the turning-machining programming support unit 6 separates the turning remainder shape K3 by the auxiliary cutting edge angle C (Step S303). FIG. 9(a) is an example representing a turning remainder edge Q. FIG. 9(b) is an example representing the extracted turning remainder shape K3. In the case of FIG. 9, at an edge endpoint P1, because an angle formed between the tangent vector of the next edge Q and the Z axis is 90 degrees, the turning-machining programming support unit 6 determines that a cutting remainder portion is generated, and separates the turning remainder shape K3 by the auxiliary cutting edge angle C.

Figure 10:
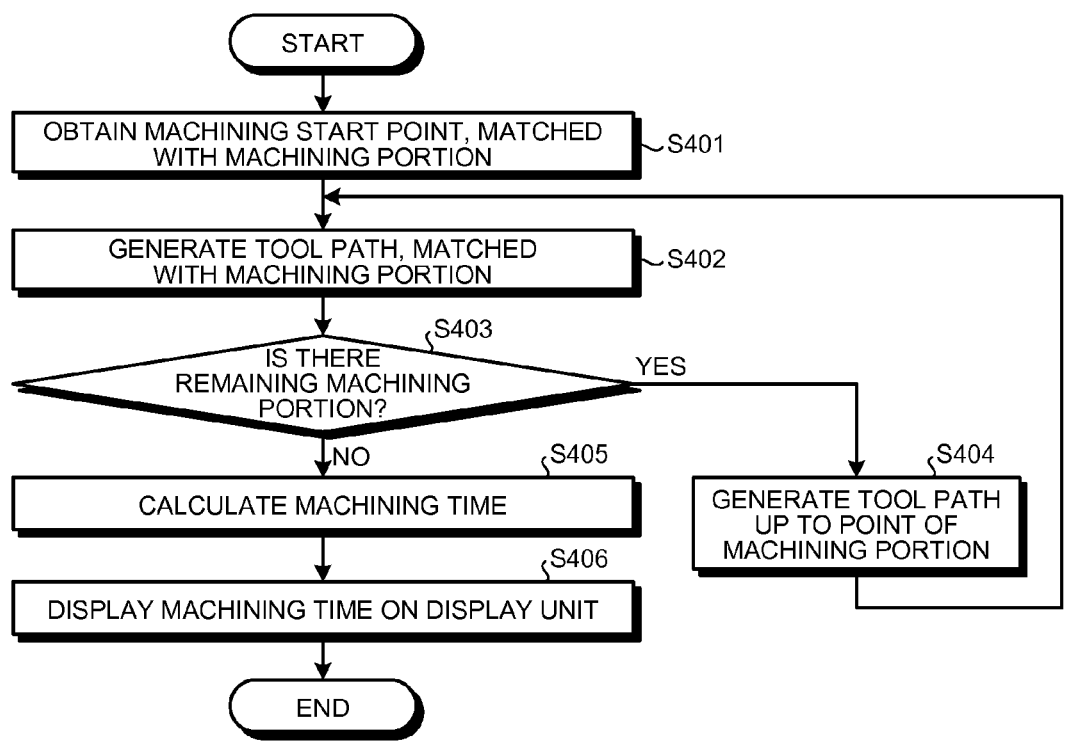
FIG. 10 is a flowchart illustrating an operation for calculating a machining time by the turning-machining programming support unit of the NC machining-program creation device according to the first embodiment of the present invention.
Figure 11:
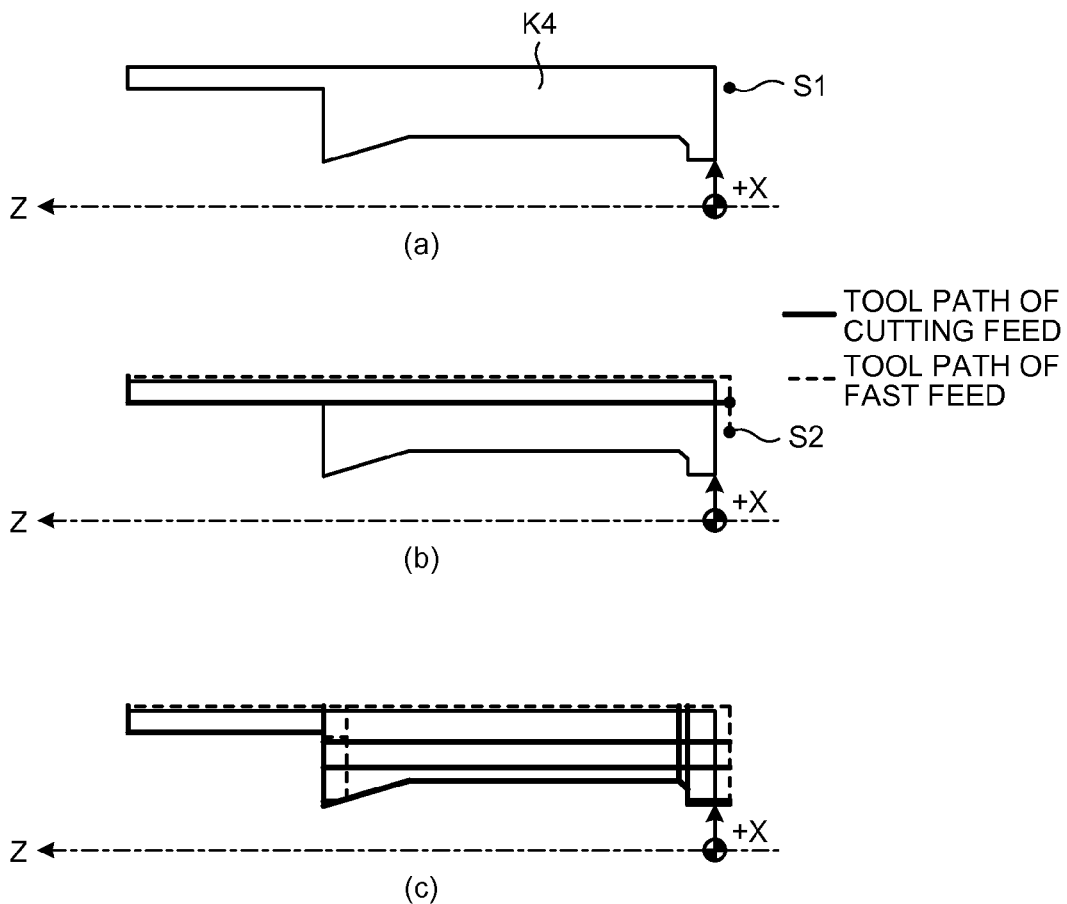
FIG. 11 are diagrams for supplementarily explaining the operation according to FIG. 10.

FIG. 10 is a flowchart illustrating details of an operation for calculating a machining time of the turning machining shape described at Step S113 in FIG. 2. The turning-machining programming support unit 6 matches the machining portion with the turning machining shape K4 from which the turning groove shape K2 and the turning remainder shape K3 due to the tool to be used are separated at Step S111 in FIG. 2 to obtain a machining start point (Step S401). In the case of the present embodiment, a position shifted from an endpoint on a +X side and a −Z side of the turning machining shape K4 toward −Z direction by a machining allowance amount, and shifted in a −X direction by a cutting amount set based on the cutting condition is a machining start point S. FIG. 11(a) is an example representing a machining starting point S1.

The turning-machining programming support unit 6 generates a tool path moving by cutting feed, matched with the machining portion (Step S402). For example, the tool path becomes a path that moves from the machining start point S1 in the +Z direction parallel to the Z axis, to an endpoint in the +Z axis direction of the turning machining shape. The turning-machining programming support unit 6 determines the presence of a remaining machining portion (Step S403). If there is a remaining machining portion, the turning-machining programming support unit 6 generates a tool path moving to the next machining start point by fast feed (Step S404). For example, a position shifted from the previous machining start point S1 in the −X direction becomes the next machining start point S2. FIG. 11(b) is an example representing the tool path of the cutting feed and the tool path of the fast feed.

The turning-machining programming support unit 6 calculates a machining time when there is no remaining machining portion (Step S405). The turning-machining programming support unit 6 calculates a cutting feed time based on all the tool paths of the cutting feed and a cutting feed rate set in the cutting condition, and calculates a fast feed time based on all the tool paths of the fast feed and a fast feed rate set in the cutting condition. A time obtained by adding the cutting feed time and the fast feed time becomes the machining time. The turning-machining programming support unit 6 displays the calculated machining time on the display unit 4 (Step S406). FIG. 11(c) is an example representing all the tool paths of the cutting feed and all the tool paths of the fast feed with respect to the turning machining shape.

Figure 12:
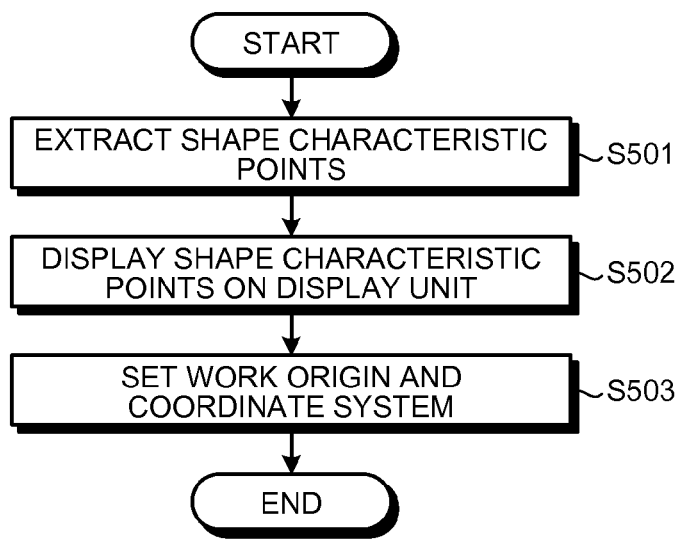
FIG. 12 is a flowchart illustrating an operation of a work-origin setting unit of the NC machining-program creation device according to the first embodiment of the present invention.

The work-origin setting unit 7 is described next in detail. FIG. 12 is a flowchart illustrating an operation of the work-origin setting unit 7. The work-origin setting unit 7 extracts both endpoints EG of an edge, an arc central point EK of an arc edge of all the edges, and four apexes TH of a cuboid containing the CAD data 20 as shape characteristic points from all the edges forming the CAD data 20 input from the CAD data input unit 1 (Step S501). The shape characteristic points extracted from the CAD data are arranged in a coordinate system represented by an XYZ coordinate. When the CAD data 20 is expressed in the boundary surface of the solid model, edges forming a three-dimensional shape and geometric information of the edges can be acquired from the CAD data 20, and the both endpoints EG of the edge, the arc central point TH of the arc edge, and the contained cuboid can be analyzed. The work-origin setting unit 7 displays the shape characteristic points EG, EK, and TH on the display unit 4 (Step S502). The work-origin setting unit 7 sets a work origin W0 and the work coordinate system based on the shape characteristic points instructed by the worker via the instruction input unit 5 (Step S503). The worker may select the work origin W0 from the shape characteristic points EG, EK, and TH, or may set the work origin W0 at a position other than the shape characteristic points EG, EK, and TH.

Figure 13:
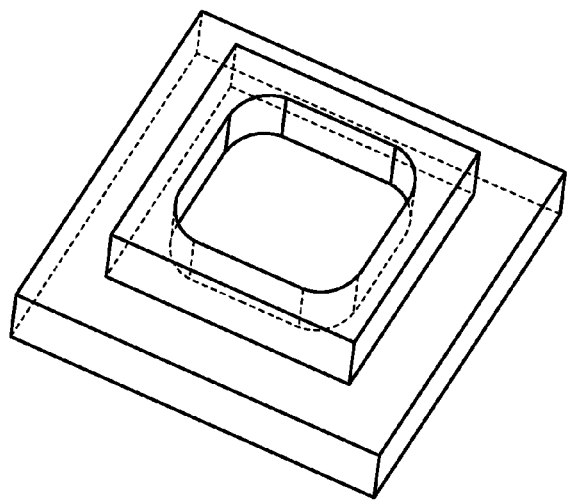
FIG. 13 is a diagram for supplementarily explaining the operation according to FIG. 12.
Figure 14:
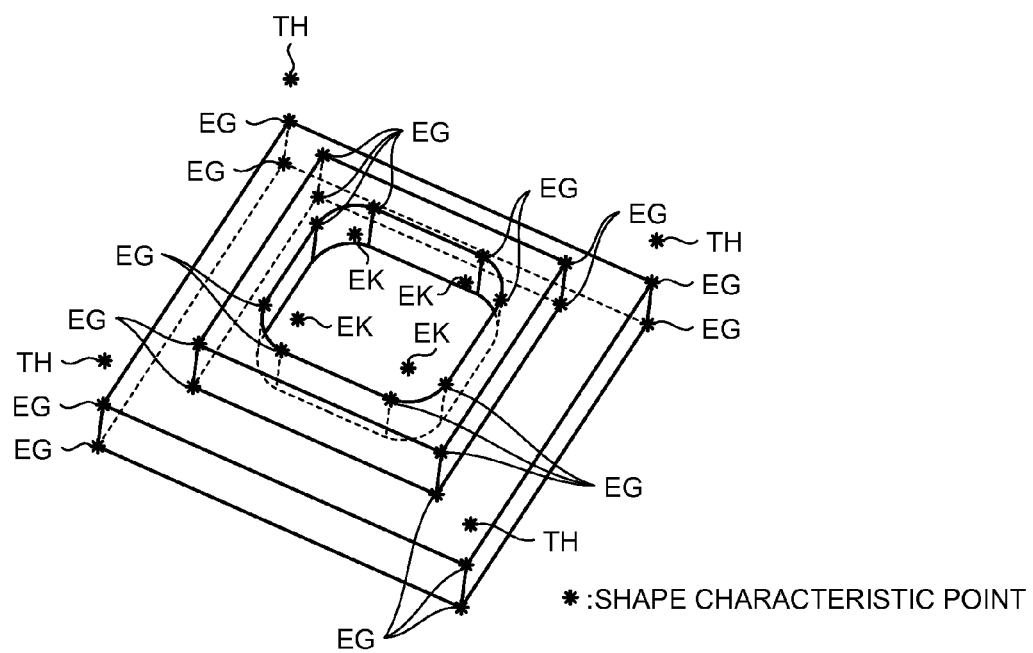
FIG. 14 is a diagram for supplementarily explaining the operation according to FIG. 12.
Figure 15:
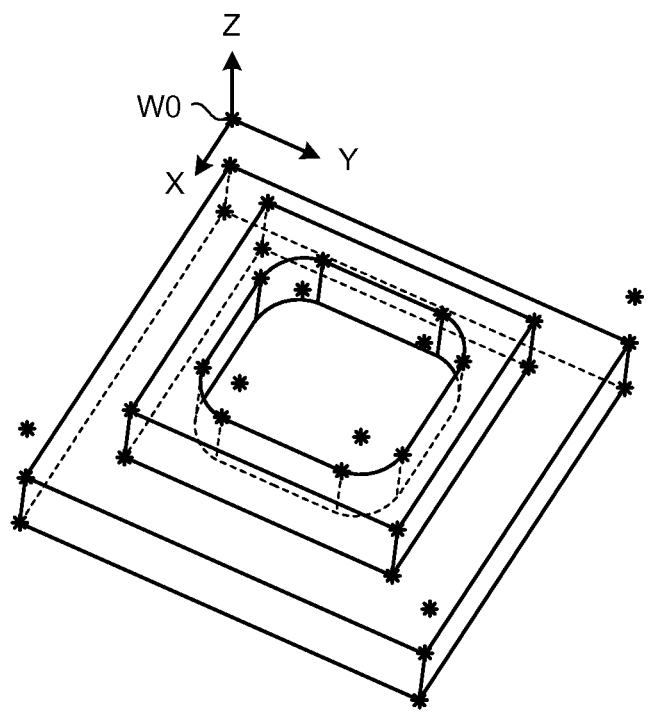
FIG. 15 is a diagram for supplementarily explaining the operation according to FIG. 12.

FIG. 13 illustrates an example of CAD data arranged on XYZ coordinate axes. FIG. 14 illustrates an example representing the extracted shape characteristic points EG, EK, and TH of the CAD data. As illustrated in FIG. 14, the shape characteristic points are displayed as, for example, "*". In this case, the arc central point EK of the arc edge is set to match with an upper surface. FIG. 15 illustrates an example of the work origin W0 and the coordinate axes arranged at a position having a minimum value in the X-axis direction, a minimum value in the Y-axis direction, and the maximum value in the Z-axis direction of the arranged cuboid containing the CAD data. FIG. 16(*a*) illustrates a case of setting the work origin W0 and the work coordinate system at the corner of the shape. FIG. 16(*b*) illustrates a case of setting the work origin W0 and the work coordinate system at the center of the shape.

Figure 17:
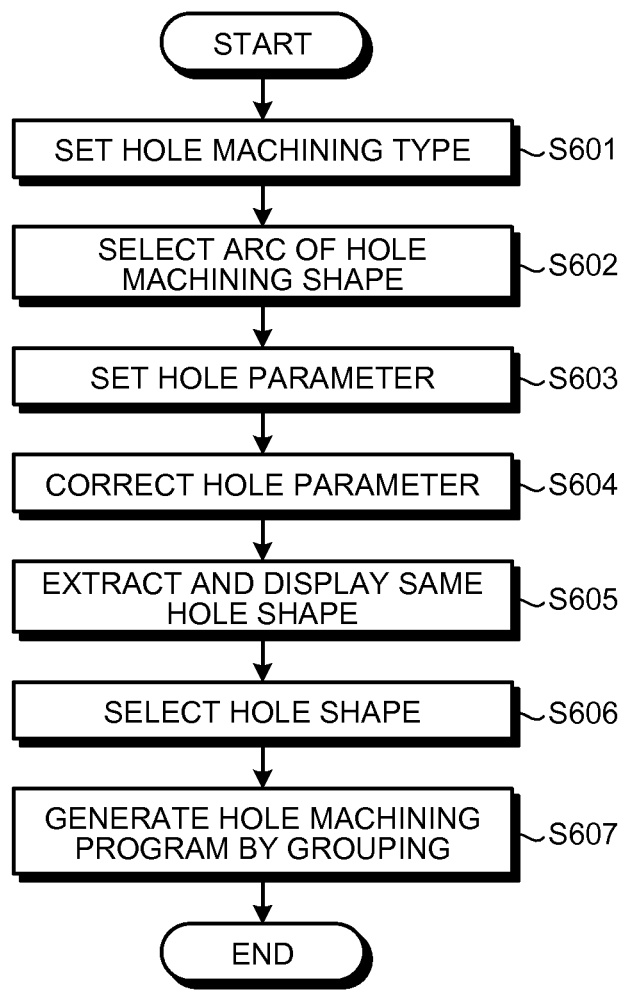
FIG. 17 is a flowchart illustrating an operation of a hole-machining programming support unit of the NC machining-program creation device according to the first embodiment of the present invention.

The hole-machining (milling) programming support unit 8 will be described next. FIG. 17 is a flowchart illustrating an operation of the hole-machining programming support unit 8. The hole-machining programming support unit 8 displays registered hole machining types of the machining types on the display unit 4. The hole machining types include, for example, "drilling", "tapping", "counter boring", and "reaming". The worker selects an arbitral hole machining type from the hole machining types displayed on the display unit 4 (Step S601). The hole-machining programming support unit 8 displays the CAD data 20 on the display unit 4. By the display, the worker specifies one arc edge at a hole edge to be hole-machined according to the hole machining type selected at Step S601, from one to a plurality of holes included in the CAD data 20 (Step S602).

The hole-machining programming support unit 8 analyzes a cylindrical surface continuing to the arc edge at the hole edge specified by the worker to analyzes values relating to hole machining parameters such as a hole diameter and a hole depth based on the cylindrical surface to set and display the values as parameters of the hole machining (Step S603). When the CAD data 20 is defined in the expression of the boundary surface of the solid model, the hole-machining programming support unit 8 can analyze whether the shape is a cylindrical surface or a conical surface by referring to geometric information of the respective boundary surfaces. Further, the hole-machining programming support unit 8 can analyze the diameter of the cylindrical surface being a hole diameter, the height of the cylindrical surface being a hole depth, the diameters, the apex angle, and the height of the upper surface and the bottom surface of the conical surface that is a chamfered portion of the hole and does not have an apex, and a diameter, an apex angle, and a height of the bottom surface of the conical surface that has an apex being a bottom of the hole.

The worker corrects the hole machining parameters determined automatically based on the fit of the hole or the dimension tolerance of the hole indicated in the drawing (Step S604). The hole-machining programming support unit 8 searches for a hole shape identical to the hole shape from the CAD data 20 and displays the hole shape on the display unit 4 (Step S605). The identical hole shape is a shape matched with the dimension of the chamfered portion formed of the conical surface that constitutes the hole, the dimension of the hole formed of the cylindrical surface, and the diameter, the height, and the apex angle of the bottom of the hole formed of the conical surface having an apex. The worker selects a required hole shape from the hole shapes displayed on the display unit 4 (Step S606). The hole-machining programming support unit 8 groups the selected hole shapes as a group of the same hole machining type and identical hole machining shapes, and generates a hole machining program including information such as the hole machining type relating to the grouped holes, the hole machining shape, and the hole machining data (a hole position or the like) (Step S607). Such process is performed repeatedly for each of the hole machining types.

FIG. 18(*a*) illustrates an example representing CAD data in which tapping M6 and reaming finishing are specified as the hole machining type. Holes of tapping M6 are indicated by reference signs TPM6, and holes of reaming finishing machining are indicated by reference signs RM. For example, when the worker selects "tapping" as the hole machining type at Step S601, and selects and instructs one of four tappings M6 (TPM6) illustrated in FIG. 18(*a*) (Step S602), the selected and instructed hole machining parameter is displayed on the display unit 4 (Step S603), and the worker corrects the displayed machining parameter (Step S604).

The hole-machining programming support unit 8 searches for a hole shape identical to the hole shape selected and instructed at Step S602 from the CAD data 20, and displays the hole shape on the display unit 4 (Step S605). In this case, as illustrated in FIG. 18(*b*), because the four tappings M6 (TPM6) and the six reaming finishing holes RM have identical hole shapes, the four tappings M6 (TPM6) and the six reaming finishing holes RM are highlighted on the display unit 4 by changing the color or the like. The worker selects and instructs holes to be subjected to tapping M6 (TPM6) from ten highlighted holes (Step S606). The hole-machining programming support unit 8 groups the selected hole shapes as a group of the same hole machining type and identical hole machining shapes, and generates information such as the hole machining type, the hole machining shape, and the hole machining data (a hole position or the like) relating to the grouped holes as a hole machining program (Step S607). The same process is also performed with respect to the holes whose hole machining type is reaming finishing machining.

Figure 19:
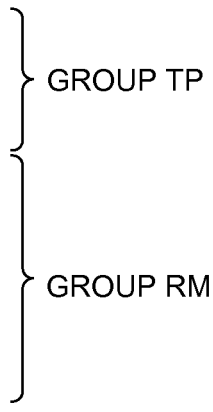
FIG. 19 is a diagram for supplementarily explaining the operation according to FIG. 17.

FIG. 19 illustrates a hole machining program relating to ten holes having identical hole shapes illustrated in FIG. 18. The hole machining program is classified into a group TP relating to four holes whose machining type is tapping, and a group RM relating to six holes whose machining type is reaming finishing machining.

In this manner, according to the present embodiment, machining shape portions of turned grooves and cutting remainder portions due to a turning tool to be used are automatically extracted, and these machining shapes of the turned grooves and cutting remainder shapes are separated from a shape to be removed by the turning machining. Therefore, unsetting and undivided portions of these shape portions do not occur, and an NC machining program for turning while moving by cutting feed can be created easily and efficiently, with less time and labor. Further, because the turning machining time by the cutting feed is calculated and displayed based on the turning tool to be used and turning machining data including a cutting condition, a worker can confirm the turning machining time.

In the present embodiment, the work-origin setting unit 7 and the hole-machining programming support unit 8 are provided. However, in a case of a program creation device dedicated for turning machining, the configuration of the work-origin setting unit 7 and the hole-machining programming support unit 8 may be omitted.

INDUSTRIAL APPLICABILITY

The numerical-control machining-program creation device according to the present invention is suitable for creation of an NC program for turning machining.

REFERENCE SIGNS LIST

1 data input unit, 2 shape-data storage unit, 3 dialogue-operation processing unit, 4 display unit, 5 instruction input unit, 6 turning-machining programming support unit, 7 work-origin setting unit, 8 hole-machining programming support unit, 9 NC machining-program generation processing unit, 20 CAD data, 30 NC machining program, 101 NC machining-program creation device, 102 NC programming support device.

The invention claimed is:

1. A numerical-control machining-program creation device that creates a numerical-control machining program including turning machining based on shape data of a workpiece, comprising:
a turning sectional-shape generation unit that generates a three-dimensional turning shape designating a turning shaft as a rotation central axis from shape data of a workpiece, and generates a two-dimensional turning sectional shape based on the generated turning shape;
a turning-machining removal-shape generation unit that generates a first turning-machining removal shape indicating a shape to be removed by turning machining based on the two-dimensional turning sectional shape;
a turning-groove-shape extraction unit that extracts a convex shape, having a groove width equal to or less than a set groove width and a groove depth equal to or less than a set groove depth, as a turning groove shape from the first turning-machining removal shape; and
a numerical-control machining-program creation unit that creates the numerical-control machining program for turning machining based on a second turning-machining removal shape obtained by separating the turning groove shape from the first turning-machining removal shape.

2. The numerical-control machining-program creation device according to claim 1, further comprising a cutting-remainder-shape extraction unit that extracts a cutting remainder shape due to a turning tool, wherein
the numerical-control machining-program creation unit creates a numerical-control machining program for turning machining based on a third turning-machining removal shape obtained by separating the turning groove shape and the cutting remainder shape from the first turning-machining removal shape.

3. The numerical-control machining-program creation device according to claim 2, wherein the cutting-remainder-shape extraction unit extracts a convex shape from a turning-machining removal shape, to obtain an auxiliary cutting edge angle of a turning tool to be used based on set turning machining data, and extracts a cutting remainder shape from the extracted convex shape based on the auxiliary cutting edge angle.

4. The numerical-control machining-program creation device according to claim 1, wherein the turning-groove-shape extraction unit obtains a tangent vector of an edge for each apex of the two-dimensional turning sectional shape, the apex being a connection point between edges, and extracts a convex shape based on the tangent vector.

5. The numerical-control machining-program creation device according to claim 1, further comprising a machining-time calculation unit that calculates a turning machining time by cutting feed based on the second turning-machining removal shape, a turning tool to be used, and turning machining data including a cutting condition, and displays the turning machining time.

6. The numerical-control machining-program creation device according to claim 2, further comprising a machining-time calculation unit that calculates a turning machining time by cutting feed based on the third turning-machining removal shape, a turning tool to be used, and turning machining data including a cutting condition, and displays the turning machining time.

7. The numerical-control machining-program creation device according to claim 3, wherein the cutting-remainder-shape extraction unit obtains a tangent vector of an edge for each apex of the two-dimensional turning sectional shape, the apex being a connection point between edges, and extracts a convex shape based on the tangent vector.

* * * * *